July 24, 1934. G. F. WEATON 1,967,274
PYRO ELECTRIC METALLURGICAL FURNACE AND PROCESS
Filed March 14, 1932
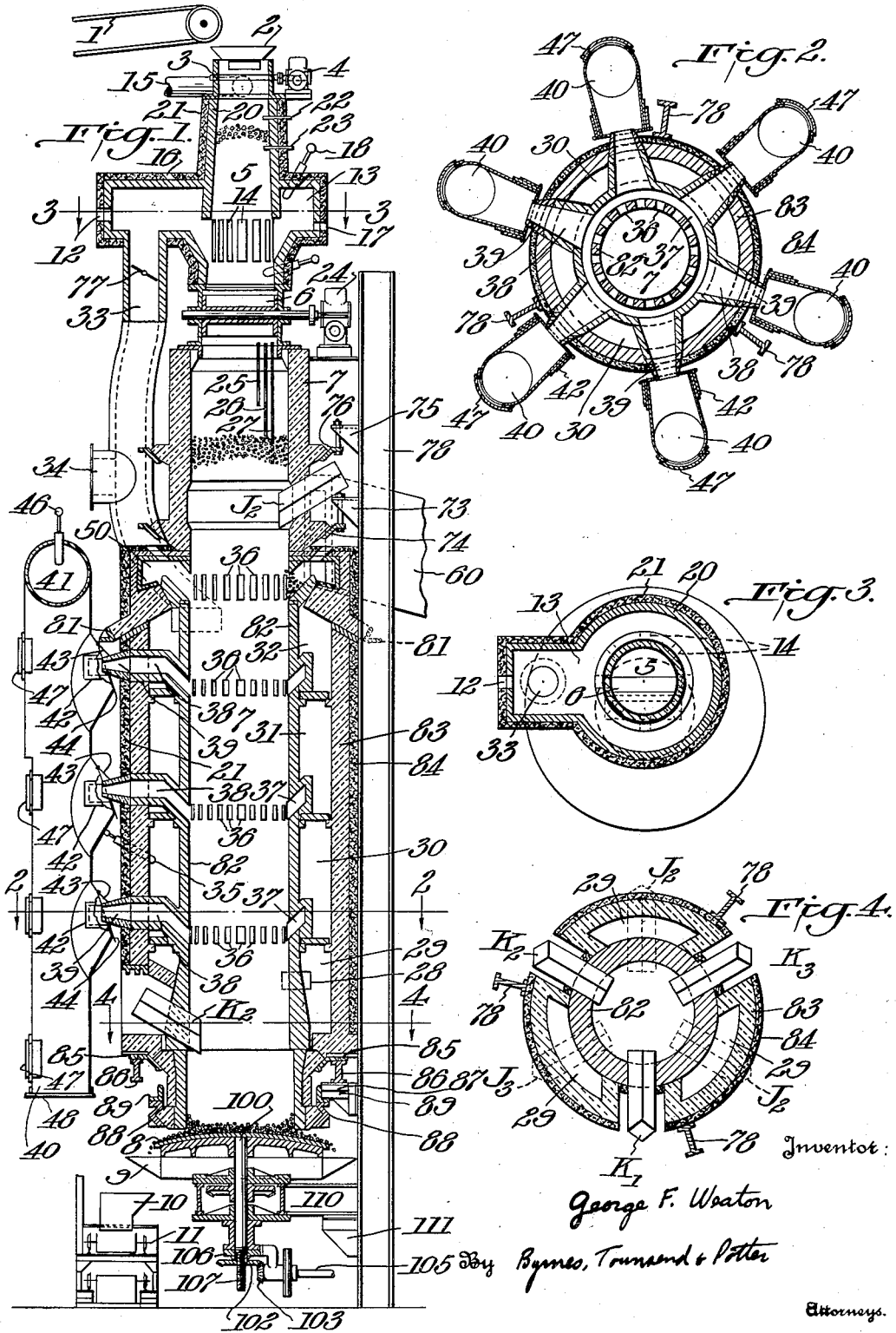

Patented July 24, 1934

1,967,274

UNITED STATES PATENT OFFICE 1,967,274

PYRO-ELECTRIC METALLURGICAL FURNACE AND PROCESS

George F. Weaton, Beaver, Pa., assignor to St. Joseph Lead Company, New York, N. Y., a corporation of New York Application March 14, 1932, Serial No. 598,817

22 Claims. (Cl. 13—8)

In the art of smelting non-ferrous ores and particularly the ores of zinc where reduction is carried out under practically non-oxidizing conditions modern technology has developed two systems of obtaining from a single retort or furnace capacities of several tons per day. The two systems are the so-called vertical retort system as disclosed by Patent No. 1,678,607 and the electrothermic shaft furnace as described in U. S. Patent No. 1,775,591 to Earl C. Gaskill.

The disadvantages of the vertical retort type furnace are: It must receive a charge of ores so thoroughly incorporated with carbonaceous or non-slagging material that no slag or accretions will be deposited upon the retort or combine with the refractories of which the retort is constructed. The retort must be narrow, which sharply limits the capacity of a single retort, inasmuch as it has been found that when the total amount of heat is conducted through the refractory wall, even a wall of high heat conducting capacity, such as silicon carbide, the distance the heat can be carried from the wall by conduction of the charge and conduction by the gases is relatively short. Moreover, practical limitations of heat transfer relative to economy limit the degree of zinc elimination from the charge, causing a considerable irrecoverable loss in the residues.

The electrothermic system also has a major disadvantage, inasmuch as heat energy derived from electricity is relatively expensive compared to a like amount of heat energy obtainable from gas, oil, or solid fuels. The advantages, however, of the electrothermic system are practically an unlimited size of furnace, a capacity from a single furnace of 50 tons per day being possible and the fact that it can be charged with a mixture of sintered ore and coke or briquettes of zinciferous material, or with any charge which will maintain sufficient porosity to allow the escape of vapors from the large mass within the furnace.

The object of this invention is to provide a system for the smelting of zinc ores either in the form of briquettes or as a loose, porous combination of sintered zinc ore and coke, which combine the advantages of the externally heated vertical retort with the inherent advantages of the electrothermic process. In such a process the ores in the form of briquettes, sinter or other aggregates of zinciferous materials, and coke or coal, may be first preheated and then continuously charged into the furnace, continually passing downward through the shaft, the worked-off material being discharged from the bottom of the furnace, the charge being externally heated throughout the major portion of the smelting zone, this heating supplementing the heat generated by the resistance of the charge to the passage of electric current between electrodes in contact therewith. The heat supplied externally and conducted through the retort walls, which may be of silicon carbide or cast mullite, heats the charge adjacent to the wall and furnishes heat sufficient to compensate for that lost by radiation from the furnace or by such revolatilization as may be necessary due to any reoxidation in the furnace, which requires additional heat from the reduction cycle, and for the sensible heat lost in the residues. Electric energy is used or is necessary only in the amount theoretically required to reduce and volatilize the zinc, which is sufficient to maintain a thoroughly uniform temperature condition throughout the shaft or rectangular vertical retort. This condition may be obtained even when the shaft diameter or width of the rectangular retort is as great as 20% or more of the distance between the electrodes.

The invention will be more particularly described for the purpose of illustration with reference to the accompanying drawing, in which:

Figure 1 is a vertical section of an embodiment of the invention equipped for the concurrent production of spelter and zinc oxide; and Figures 2, 3 and 4 are horizontal sections on lines 2—2, 3—3, and 4—4, respectively, of Figure 1.

In order that a better understanding of the process and the apparatus used may be had, the invention will be described, using the briquette charge by way of example.

Briquettes made according to copending application Serial No. 655,516, filed Feb. 6, 1933, or any briquette which has sufficient residue strength when its zinc content is reduced to approximately ½%, are charged from belt 1 into hopper 2. Vertical gate 3 is opened by means of gearing and motor 4, allowing briquettes contained in hopper 2 to fall into preheater shaft 5. Rotating gate 6 maintains a substantially gastight seal between furnace 7 and preheater shaft 5, and is driven through gear 24 by a variable speed motor. There is a constant progression of charge, therefore, down preheater 5 and into furnace 7 by way of rotary valve 6. The charge level in the furnace is maintained approximately as shown, several feet above the upper electrode $J^2$.

It is preferable that the electrodes be properly disposed about the furnace, each circuit pair of electrodes as $J^1$, $K^1$, $J^2$, $K^2$, $J^3$, $K^3$, being independently controlled in order that uniformity of furnace conditions may be thereby maintained. Alternating current may be used, a normal unit direction being from $J^2$ to $K^2$.

Heat is also supplied from combustion chambers and laboratories 29, 30, 31 and 32, through the walls 82, which may be of silicon carbide, cast mullite, or other high-grade high-heat-conducting refractory. While the source of this heat may be either gas, oil or solid fuels, it will be described as operating on gas, which may be tangentially introduced, together with highly preheated air, through ports 28 in laboratory 29. It is desirable to maintain a temperature of 1225 to 1250 degrees in laboratory 30 as indicated by pyrometer 35. Gas burners, if desired, may also be installed in laboratories 30, 31 or 32.

In the practice of our invention the table 8, which is preferably a segment of a sphere, is rotated at a speed of from ½ to ¼ revolutions per minute, the residue briquettes falling from the table into pan 9, from which they are removed by a plow, not shown, working in pan 9, which spills the residue briquettes into hopper 10, the hopper 10 in turn discharging onto pan conveyor 11 for disposal.

Preheater 5 is provided with furnace 13 having port 12. A gas or oil burner may be installed in this port for the preliminary heating of the charge before the smelting process is under way, the products of combustion passing through ports 14 in wall 20 and upward through the interstices between the briquettes, being drawn out through pipe 15 and through suitable washing equipment, and fan, not shown, for providing the desired draft on preheater 5.

Under normal operation the waste gases from the laboratory 32 would pass upward through 33, a portion going to furnace 13 for the preheating of the briquettes or charge, the remainder of the gases passing out 34 through a recuperator, not shown, wherein the necessary air for combustion at burner ports 28 would be heated to a high temperature, the gases being drawn through the recuperator by a fan, not shown.

The gases passing from 33 into preheater furnace 13 are controlled by damper 77 and if their temperature be too high, say above 875° C., air is admitted through port 12. Temperatures are indicated in the preheater furnace by pyrometer 18. Access is permitted into the furnace for purposes of cleaning, by ports 16, and any ash or other materials tending to deposit on the floor of furnace 13 may be cleaned out through ports 17. The height of the charge in preheater 5 is indicated by contact rods 22 and 23, which actuate signal lights and relays to operate gate 3 at proper intervals. Preheater walls 20 are preferably constructed of silicon carbide or cast mullite, or they may be constructed of fire brick, the whole furnace and preheater being insulated by insulating brick 21.

The products of volatilization of the charge, together with the reducing gases, are discharged from the furnace through ports 36, and in case these vapors are to be oxidized, pass out into annular chambers 37 into which are connected ducts 38, in which are inserted oxidizing tuyères 39.

The particle size of the zinc oxide may be controlled by adjusting the rate of oxidation of the vapors issuing from oxidizing tuyères 39 by means of air admission doors 42 and 43 and slide gates 44, oxidation taking place in the manifold 40 being complete when drum 41 is reached. Pyrometer 46 indicates the temperature of the oxide stream from the furnace. Doors 47 give access to the tuyères for cleaning out the rock oxides or other accretions which may form. Any droppings which might occur in manifold 40, together with the rock oxides cleaned from the tuyères, are removed through door 48 in the bottom of the manifold 40. In the practice of the invention it is advantageous to use a multiplicity of tuyères in order that the quality of the product may be closely controlled and uniformly maintained over a long period of operation.

For the production of spelter, the products of volatilization of the zinciferous materials pass out through ports 36, as in the case of oxidizing the vapors, into an annular condenser ring 50. This ring is maintained at a suitable slope toward the discharge to a metal sump and finishing condenser at 60, for example of the type shown in copending application Serial No. 595,365, filed Feb. 26, 1932, now Patent No. 1,901,543. While the velocities are kept relatively low through ports 36 to permit the gases and vapors emanating from the charge at the junction of the charge with these ports to pass out freely, the velocity in the annular condenser 50 is relatively high, as is the discharge in the finishing condenser 60.

Figure 2 shows the preferred arrangement of tuyères when oxidizing the vapors from the furnace, also showing the location plan of the furnace structures and manifolds 40.

Figure 3 is a section through the preheater furnace and preheater looking down on rotary feed gate 6.

Figure 4 shows a section through the lower electrodes which are shown in solid lines and marked $K^1$, $K^2$ and $K^3$, and in order to show the proper impression of the relationships between these and the top electrodes $J^1$, $J^2$ and $J^3$ the latter are superimposed with dash lines. As before explained, the circuit is from $J^1$ to $K^1$, etc.

Preheater 5 and rotary feed gate 6 may be suitably supported and mounted upon structural steel. Furnace section 75 will be carried by columns 78 by means of brackets 77 and skew rings 76. Electrode section 79 is likewise carried by column 78, bracket 73 and skew ring 74. Skew ring 81, which is connected directly into column 78 with the proper amount of insulation, carries the load imposed by the annular condenser. The inner lining 82, outer lining 83 which may be made of any high-grade refractory, and insulation 84, are carried by column 78, brackets 87, beam 86 and skew ring 85, properly insulated. Skew ring 88 carries the bottom section or flaring discharge mouth of the furnace, this being hung by means of angle 89 from brackets 87.

The rate of feed from table 8 may be varied by variation of the speed of the table, also by the orifice opening between the furnace bottom and the table, which is readily adjustable by means of a motor-driven gear operating on shaft 105 and crown gears 103 and 102, respectively, which raise or lower screw 107 operating against thrust bearing 106 at the end of the shaft 100. The table 8 and adjusting mechanism are more particularly described in copending application Serial No. 606,442, filed Apr. 20, 1932, now Patent No. 1,932,388. Table 8 with its structure is carried by beams 110 upon properly insulated brackets 111 which in turn are made fast to clamps 78.

The height of the charge in the furnace is indicated by indicator rods 25, 26 and 27. The charge being highly conducting, all that is necessary is to run a wire from each of these mentioned rods through a lamp of the proper voltage, connecting the other side of the circuit to any one of the three K electrode circuits. When the charge makes contact with any of the rods, the corresponding light will indicate the height of the charge.

The advantages of this system of smelting zinciferous materials may be summed up as follows: Preheating, which is continuous and practically an integral part of the furnace operation, is effected to the desired temperature by the waste products of combustion from the laboratories of the smelting furnace. Inasmuch as the preheater is practically an integral part of the furnace, no heat is lost in transferring the charge from the preheater into the furnace, all parts being subject to adequate insulation.

Any briquette having proper residue strength regardless of its properties of shrinkage or breakage, providing the fines caused by such practice do not exceed 20% of the charge, may be utilized as well as a charge of sintered ore and coke properly sized to provide the necessary voids in the charge for the escape of the vapors and gases.

The use of supplemental external heating effects a major economy in the use of an electric current for maintaining heat distribution and smelting of the charge. The use of the electric current in such an arrangement as described in connection with the external heating of the retort commends itself to the erection of units of large tonnage, up to say 20 tons per 24 hours in circular shaft furnaces and 50 tons or more in rectangular furnaces.

By the use of multiple tuyères or vapor exits from the furnace the superior quality of the product is uniformly maintained. Any number of tuyères desired may be put onto such a furnace, although the number shown is advantageous and allows wide latitude of control, whereas with a smaller number of tuyères a very wide range of control may be difficult and becomes increasingly so as a single outlet for the vapors and gases is approached. It has long been the belief of metallurgists that the difficulties attendant upon the condensation of zinc vapors were largely caused by dust and fine particles of the charge and carbonaceous materials being carried over by the vapor and gas stream to the condensers which, without question, has been the cause of failure in many attempts to condense vapors from an electric furnace where large quantities of vapors were generated. The use of multiple ports in the furnace herein described serves to decrease the velocity below the point at which it will carry any considerable amount of dust, effecting a substantial reduction in the troubles always experienced in condensing zinc vapors. In the furnace as described above, the condensation of the vapors to metallic zinc and oxidation of vapors for the manufacture of zinc oxide pigments may proceed simultaneously, as over long periods the operations will not vary, the ease of control and the continuity of the operation making regularity of production readily attainable.

Due to the combination of applying heat externally to the retort as well as electrical energy to cause an even distribution of heat throughout the smelting zone, elimination of 97 or 98 percent of the zinc from the charge may be effected. The residue discharge being continuous and regular, it can be properly screened and disposed of without dust or noxious gases being present as when a retort is intermittently charged and discharged.

It will be seen that the invention broadly comprises a method for the reduction of zinciferous materials by subjecting a porous charge of zinc to the combined heating action of an electric current passed therethrough and of an external source of heat, as well as apparatus for carrying the method into effect. The invention is not limited to the particular apparatus shown by way of example, but the principle of the invention may be embodied in other forms of apparatus. For example, as indicated in the foregoing description, the principle of the invention may advantageously be applied to rectangular vertical furnaces of large capacity. The number and arrangement of the electrode circuits, and of the other furnace parts and attachments, will of course be varied in accordance with the shape and size of the furnace.

The principle of the invention may be applied to the reduction and/or volatilization of numerous metals and metallurgical products, it being particularly advantageous in the reduction of zinciferous materials as described herein.

I claim:

1. A method of reducing zinciferous materials which comprises passing a loose porous charge of zinciferous material and carbonaceous material in a vertical column between spaced electrodes, passing an electric current through said charge and concurrently supplying heat to said charge by conduction from an external source.

2. In the electrothermic reduction of zinciferous materials by passing an electric current through a loose porous charge of zinciferous material and carbonaceous material, the improvement which comprises concurrently supplying supplemental heat to said charge by conduction from an external source.

3. A method of reducing zinciferous materials which comprises passing a loose porous charge consisting of aggregates of zinciferous material and carbonaceous material in a vertical column between spaced electrodes, passing an electric current through said charge and concurrently supplying heat to said charge by conduction from an external source.

4. A method of reducing zinciferous materials which comprises preheating a loose porous charge of zinciferous material and carbonaceous material continuously and directly passing said material into the path of an electric current, heating said preheated charge to reduction and volatilization temperature by said electric current while supplying supplemental heat to said charge by conduction from an external source and continuously removing the spent residue of said charge.

5. A method of reducing zinciferous materials which comprises preheating a loose porous charge of zinciferous material and carbonaceous material, continuously and directly passing said material into the path of an electric current, heating said preheated charge to reduction and volatilization temperature by said electric current while supplying supplemental heat to said charge by conduction from an external source, removing vapors from said charge at a plurality of points, and continuously removing the spent residue of said charge.

6. A method of reducing zinciferous materials which comprises preheating a loose porous charge consisting of aggregates of zinciferous material and carbonaceous material, continuously and directly passing said material into the path of an electric current, heating said preheated charge to reduction and volatilization temperature by said electric current while supplying supplemental heat to said charge by conduction from an external source, and continuously removing the spent residue of said charge.

7. A method of reducing zinciferous materials which comprises preheating a loose porous charge of zinciferous material and carbonaceous material, continuously and directly passing said material into the path of an electric current, heating said preheated charge to reduction and volatilization temperature by said electric current while supplying supplemental heat to said charge by conduction from hot combustion gases circulated in indirect contact with said charge, and continuously removing the spent residue of said charge.

8. A method of reducing zinciferous materials which comprises preheating a loose porous charge of zinciferous material and carbonaceous material by direct contact with hot combustion gases, continuously and directly passing said material into the path of an electric current, heating said preheated charge to reduction and volatilization temperature by said electric current while supplying supplemental heat to said charge by conduction from hot combustion gases circulated in indirect contact with said charge, and continuously removing the spent residue of said charge.

9. A method of reducing zinciferous materials which comprises preheating a loose porous charge of zinciferous material and carbonaceous material by direct contact with hot combustion gases, continuously and directly passing said material into the path of an electric current, heating said preheated charge to reduction and volatilization temperature by said electric current while supplying supplemental heat to said charge by conduction from hot combustion gases circulated in indirect contact with said charge, and continuously removing the spent residue of said charge, the combustion gases used for indirectly supplying supplemental heat to the charge being thereafter used for preheating the charge by direct contact therewith.

10. Apparatus for the electrothermic reduction of ores comprising heat-conductive walls defining a vertical chamber, means for passing an electric current through a conductive charge in said vertical chamber, and means for supplying heat to the exterior of said chamber.

11. Apparatus for the electrothermic reduction of ores comprising heat-conductive walls defining a vertical chamber, a plurality of spaced electrodes at the upper portion of said chamber and corresponding number of spaced electrodes at the lower portion of said chamber, means for supplying electrical energy to each pair of electrodes and means for supplying heat to the exterior of said chamber.

12. Apparatus for the electrothermic reduction of ores comprising heat-conductive walls defining a vertical chamber, means for passing an electric current through a conductive charge in said vertical chamber, means defining a gas passage outside the heat conductive walls of said vertical chamber and means for supplying hot combustion gases to said gas passage.

13. Apparatus for the electrothermic reduction of ores by the passage of electric current through a conductive charge comprising heat-conductive walls defining a vertical chamber, electrodes at the upper and lower portions of said chamber, means defining a gas passage external to said chamber and means for supplying hot combustion gases to said gas passage.

14. Apparatus for the electrothermic reduction of ores by the passage of electric current through a conductive charge comprising heat-conductive walls defining a vertical chamber, electrodes at the upper and lower portions of said chamber, means defining a gas passage external to said chamber, means for supplying hot combustion gases to said gas passage, a preheater above said vertical chamber, and means for passing gases from said gas passage into the interior of said preheater.

15. Apparatus for the electrothermic reduction of ores by the passage of electric current through a conductive charge comprising heat-conductive walls defining a vertical chamber, electrodes at the upper and lower portions of said chamber, means defining a gas passage external to said chamber, means for supplying hot combustion gases to said gas passage, a preheater above said vertical chamber, means for passing solid material from said preheater into said vertical chamber, without permitting the flow of any substantial amount of vaporous material from said vertical chamber into said preheater, and means for passing gases from said gas passage into the interior of said preheater.

16. Apparatus for the electrothermic reduction of ores comprising heat-conductive walls defining a vertical chamber, means for passing an electric current through a conductive charge in said vertical chamber, means for supplying heat to the exterior of said chamber, and means for removing solid residual material from the bottom of said vertical chamber.

17. Apparatus for the electrothermic reduction of ores comprising heat-conductive walls defining a vertical chamber, means for passing an electric current through a conductive charge in said vertical chamber, means for supplying heat to the exterior of said chamber, and means for continuously removing solid residual material from the bottom of said vertical chamber.

18. Apparatus for the electrothermic reduction of ores by the passage of electric current through a conductive charge comprising heat-conductive wall defining a vertical chamber, electrodes at the upper and lower portions of said chamber, means for removing vapor from said vertical chamber at a plurality of points, means defining a gas passage external to said chamber, and means for supplying hot combustion gases to said gas passage.

19. Apparatus for the electrothermic reduction of ores by the passage of electric current through a conductive charge comprising heat-conductive walls defining a vertical chamber, electrodes at the upper and lower portions of said chamber, means for removing vapor from said vertical chamber at a plurality of levels, means defining a gas passage external to said chamber, and means for supplying hot combustion gases to said gas passage.

20. Apparatus for the electrothermic reduction of ores by the passage of an electric current through a conductive charge comprising heat-conductive walls defining a vertical shaft, electrodes at the upper and lower portions of said shaft, an annular chamber external to said shaft and means for supplying hot combustion gases to said chamber.

21. Apparatus for the electrothermic reduction of ores by the passage of an electric current through a conductive charge comprising heat-conductive walls defining a vertical shaft, electrodes at the upper and lower portions of said shaft, an annular chamber external to said shaft, means for supplying hot combustion gases to said chamber and an annular passage external to said shaft and communicating therewith through a plurality of openings and communicating externally with apparatus for treating vaporous products generated in said shaft.

22. Apparatus for the electrothermic reduction of ores by the passage of an electric current through a conductive charge comprising heat-conductive walls defining a vertical shaft, electrodes at the upper and lower portions of said shaft, an annular chamber external to said shaft, means for supplying hot combustion gases to said chamber, a preheater at the upper end of said shaft and means for passing gases from said annular chamber into the interior of said preheater.

GEORGE F. WEATON.